No. 643,085. Patented Feb. 6, 1900.
J. S. COPELAND.
BACK PEDALING BRAKE.
(Application filed July 21, 1899.)
(No Model.) 3 Sheets—Sheet 1.
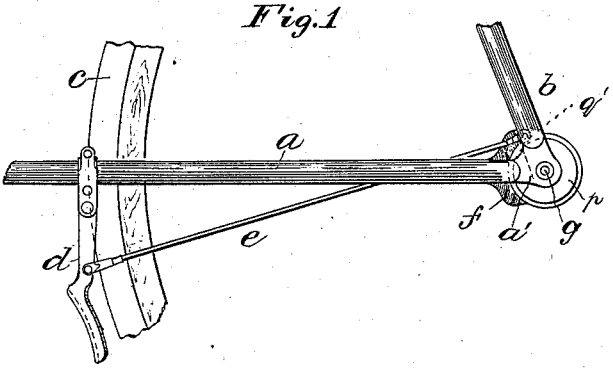
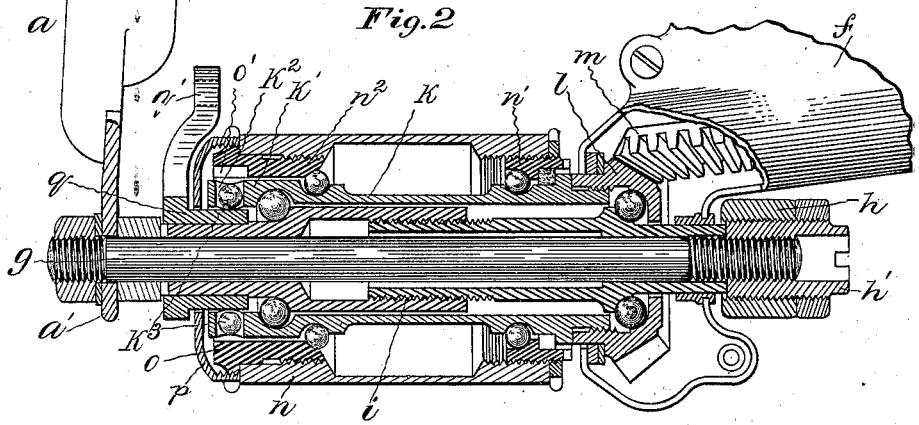
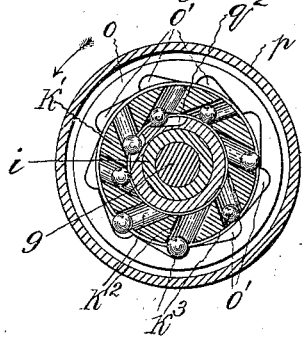
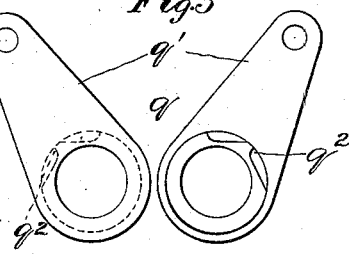
Witnesses:
William H. Barker
Arthur B. Jenkins
Inventor:
James S. Copeland
by Chas. L. Burdett,
Attorney.

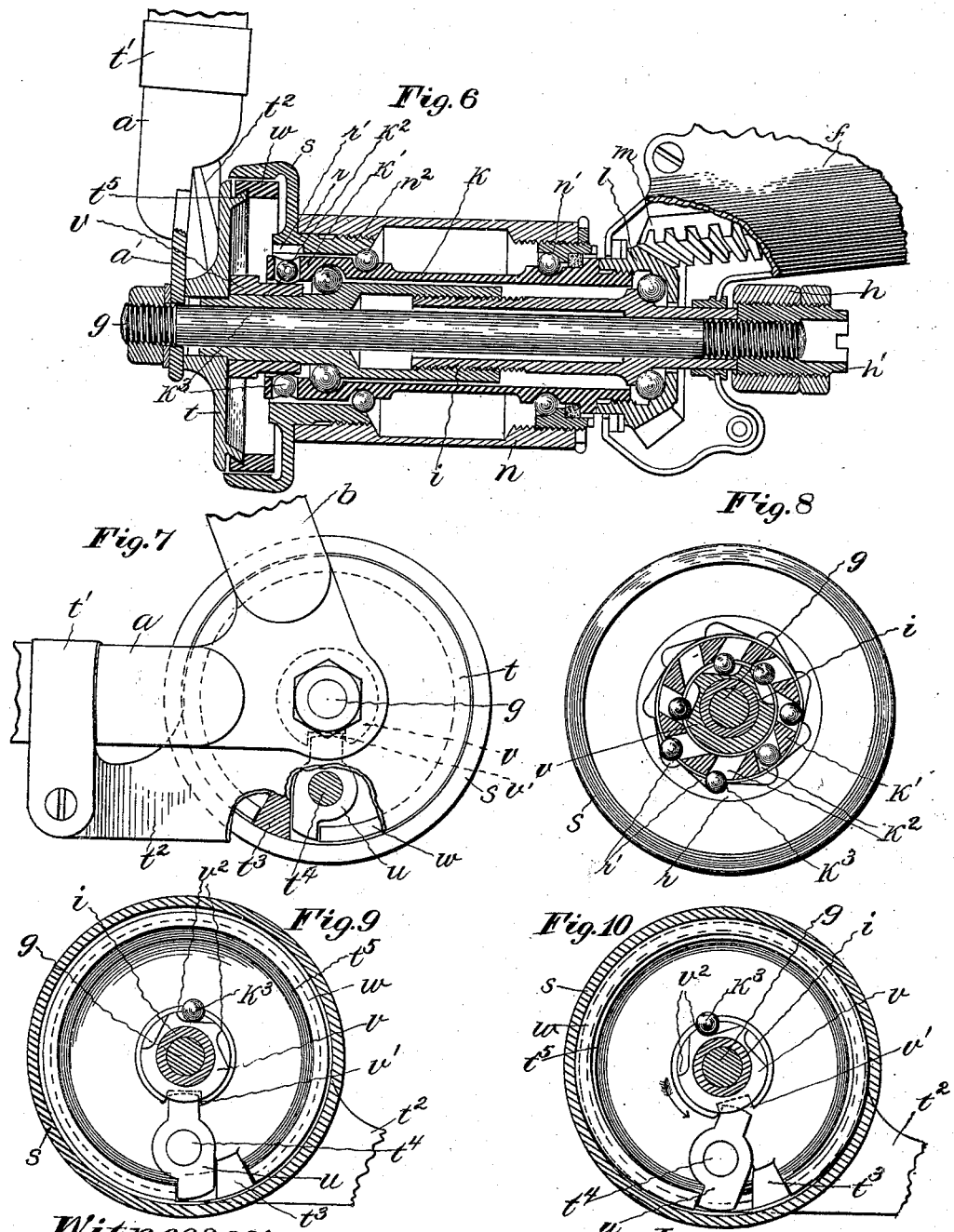

No. 643,085. Patented Feb. 6, 1900.
J. S. COPELAND.
BACK PEDALING BRAKE.
(Application filed July 21, 1899.)
(No Model.) 3 Sheets—Sheet 3.
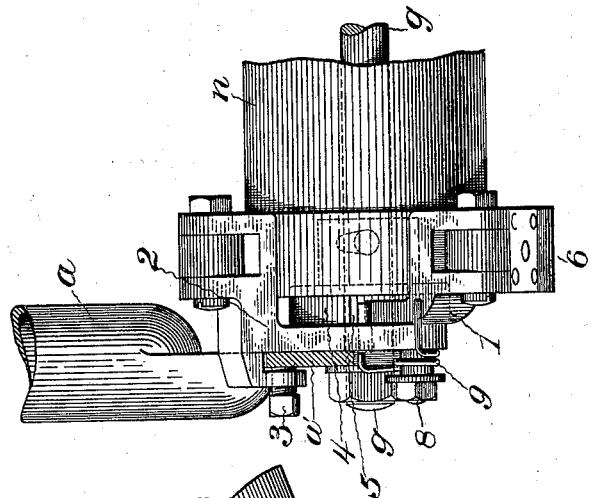
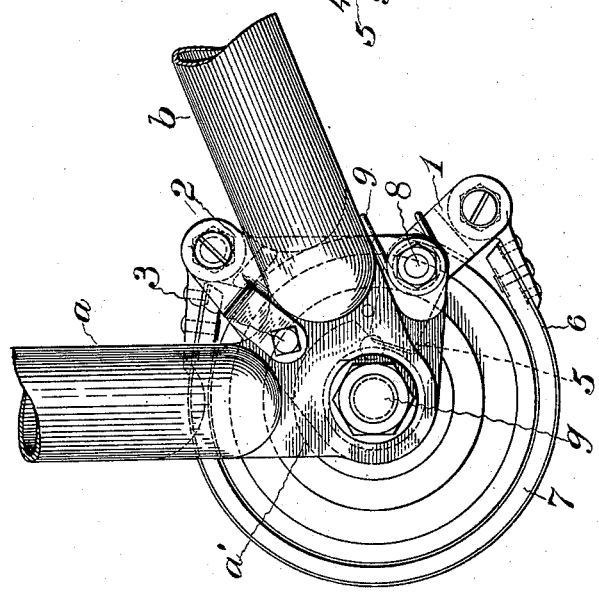
Witnesses:
William H. Barker.
Arthur G. Jenkins.
Inventor:
James S. Copeland,
by Chas. L. Burdett,
Attorney.

UNITED STATES PATENT OFFICE.

JAMES S. COPELAND, OF HARTFORD, CONNECTICUT, ASSIGNOR TO THE AMERICAN BICYCLE COMPANY, OF JERSEY CITY, NEW JERSEY, AND NEW YORK, N. Y.

BACK-PEDALING BRAKE.

SPECIFICATION forming part of Letters Patent No. 643,085, dated February 6, 1900.

Application filed July 21, 1899. Serial No. 724,652. (No model.)

*To all whom it may concern:*

Be it known that I, JAMES S. COPELAND, a citizen of the United States, and a resident of Hartford, in the county of Hartford and State of Connecticut, have invented certain new and useful Improvements in Driving and Brake Mechanism, of which the following is a full, clear, and exact description, whereby any one skilled in the art can make and use the same.

My invention relates to the class of devices employed for driving a vehicle and for retarding or stopping its progress; and the object of my invention is to provide a device of this class that shall be applicable to different forms of driving mechanism and that shall be quick-acting and effective in operation.

To this end my invention consists in the device as a whole, in the combination of parts, and in the details and their combination, as hereinafter described, and more particularly pointed out in the claims.

Referring to the drawings, Figure 1 is a view in side elevation of a portion of the lower rear fork of a bicycle having my improvement looking from the left. Fig. 2 is a detail plan view, on enlarged scale, in central lengthwise section, through the hub of the driving-wheel, showing my improvement. Fig. 3 is a view in cross-section through the same on a line passing through the openings in the carrier and showing the parts in position to drive the vehicle. Fig. 4 is a like view, but showing the parts in position to operate the brake mechanism. Fig. 5 is a detail view showing reverse sides of the brake-actuating member. Fig. 6 is a detail plan view, in central section, through the hub of the driving-wheel and showing a modified form of the invention. Fig. 7 is a detail side view of the rear end of the left lower rear fork, showing the manner of attachment of the cap to the frame and with part broken away to show construction. Fig. 8 is a detail view, in cross-section, through the brake-casing on a plane passing through the openings in the carrier and showing the parts in position to drive the vehicle and looking from the left of Fig. 6. Fig. 9 is a like view, but looking from the right of Fig. 6, the carrier being removed and a single ball-ratchet only being shown. Fig. 10 is a view similar to that of Fig. 9, but with the parts in position to operate the brake mechanism. Fig. 11 is a detail plan view of the left-hand end of the hub, showing also a modified form of band-brake mechanism in which the band-brake is located on the outside of the hub. Fig. 12 is an end view of these parts projected from the plan view and turned outward to the left.

In the accompanying drawings the letter $a$ denotes a portion of the left lower rear fork of a bicycle, $b$ a portion of the left upper rear fork, $c$ a portion of the rim of the driving-wheel, $d$ a brake pivoted in operative relation to the tire of said wheel, and $e$ a brake-rod extending rearwardly from said brake, to which it is attached, all of these parts being of ordinary construction, with the possible exception of that part of the brake-rod connections at the rear end.

The letter $f$ denotes a portion of the gear-case of a gear-driven vehicle, such having been chosen for the purpose of illustration and description of my within-described improvement, which has special advantages in connection therewith, although equally applicable to machines having other forms of driving mechanism.

The letter $g$ denotes the axle of the driving-wheel, one end of which axle is secured in the toe-piece $a'$, appurtenant to the fork side $a$, and the opposite end in the frame part $h$ in the ordinary manner of construction of gear-driven machines. A thimble $h'$ is screw-threaded to fit the screw-threaded opening in the frame part $h$, and the axle $g$ bears a screw-thread fitting the screw-threaded opening through the thimble, the thread on the outer surface of the thimble differing from that on the inner surface.

A sectional sleeve $i$ is supported by the axle and bears cones coöperating with ball-cases on the carrier-sleeve $k$ or parts secured thereto. A gear $l$ bears one of said ball-cases and is secured to the carrier-sleeve at one end of the latter, said gear meshing with a gear $m$, secured to the rear end of a connecting-shaft suitably connected, as to the crank-shaft of the vehicle. These latter parts, being familiar to those skilled in the art, have not been shown herein.

The carrier-sleeve $k$ is provided at one end with openings $k^2$ for the reception of pawls $k^3$, which are preferably made spheroidal in form, this end of the carrier-sleeve being properly termed by me a "carrier" $k'$.

The hub $n$ of the driving-wheel is loosely mounted on the carrier-sleeve $k$, ball-cases $n'$ $n^2$ being adjustably secured in the end of the hub and coöperating with cones on the exterior surface of the carrier-sleeve, the usual ball-bearings being located between these parts. A ratchet member $o$ is secured to the hub and is preferably formed from the same piece as that of which the ball-case $n^2$ is formed and as herein shown. This ratchet member and the hub are formed with abutting surfaces, so that they may be firmly united, and a cap $p$ closes the opening in the end of the hub and also serves as a lock-nut to hold the ratchet member firmly in place. This ratchet member $o$ is provided with ratchet-recesses $o'$, extending in an axial direction and of the requisite depth on one side, the recesses each gradually diminishing in depth to the opposite side, where they run out on the surface of the ratchet member. The end wall or shoulder in the recess is preferably formed to correspond to the shape of the pawl.

The openings $k^2$ in the carrier $k'$ are inclined backward, (see Figs. 3, 4, and 8,) the inner end of the opening being located in advance of the outer end when considered with relation to the forward movement of the wheel, this construction providing straight walls opposing the shoulders of the recess in the ratchet member, thus locating the pawls between two nearly-parallel surfaces as distinguished from diverging surfaces.

A brake-actuating member $q$ is loosely mounted on the sectional sleeve, with a part located opposite the openings in the carrier, and a brake-actuating arm $q'$ extends in position for connection with the brake-rod $e$. Shoulders $q^2$ are located in the upper outer surface of the brake-actuating member in position to be engaged by the pawls $k^3$.

In the operation of the device, the parts being in the position indicated in Fig. 3 of the drawings and rotating in the direction of the arrow caused by the power applied to the driving mechanism, the pawls $k^3$ are caused to engage the shoulders formed in the recesses $o'$ in the ratchet member $o$, and thus rotate the driving-wheel in a direction to move the vehicle forward. Upon release of the power the driving-wheel continues to rotate, and the inclined bottom surface of each recess $o'$ passing underneath the pawls forces them successively into the openings in the carrier located under the axle, these balls, however, falling into the recesses in the brake-actuating member $q$, as the openings in the carrier are located on the upper side of the axle. On the application of power in a reverse direction to that above described (as by back-pedaling) the pawls in the recesses in the brake-actuating member are forced against the shoulders $q^2$, turning the brake-actuating member and exerting a pull upon the brake-rod $e$, throwing the brake $d$ into contact with the tire of the wheel to retard or stop its movement. This operation of the spoon-brake by a pull enables a very light rod to be used as compared with the ordinary form in which the spoon is pushed against the tire and is of advantage.

In Figs. 6 to 10, inclusive, of the drawings I have shown the device as applied to what is known as a "band-brake mechanism." In this form of the device all of the parts are of like construction, as above described, with the exception of the brake-actuating member and the ratchet member, and for this reason these parts of like construction in these figures have been given the same reference characters as those applied to the same parts in the other figures of the drawings. In this latter form of construction the ratchet member is preferably formed integral with the ball-case, as before, at this end of the hub and has a brake-casing $s$ secured thereto or formed of the same piece. The ratchet-recesses $r'$ are formed in the same manner as in the other described device. A cover $t$ is supported by the axle $g$ or sectional sleeve and is tied to the fork side $a$, as by means of a band $t'$, secured to the arm $t^2$. A lug $t^3$ is located on the inner wall of the cover, that also bears a pivot $t^4$, on which is mounted a brake-actuating lever $u$, one end of which engages a recess $v'$ in the brake-actuating member $v$ and the other end of which engages with one end of the band-brake $w$, supported on a flange $t^5$ on the cover $t$. The opposite end of the band-brake is adapted to be forced against the lug $t^3$ on the cover. Shoulders $v^2$ are formed on the brake-actuating member, as before described with reference to the other form of the device. In this form of the device the operation of driving and free-running is the same as described with reference to the other device. In the braking operation, however, as the brake-actuating member $v$ is swung the lever $u$ is rotated on its pivot, bringing one end into contact with the end of the band-brake $w$, forcing the opposite end of said brake against the lug $t^3$. Sufficient force being applied, the band-brake is expanded against the wall of the brake-casing $s$, thus applying the brake.

In Figs. 11 and 12 a modified form of the band-brake is shown, the frame as to the parts $a$ and $b$, the hub $n$, the brake-actuating mechanism, and the driving mechanism being the same as in the other forms of my invention already herein described. The brake-actuating lever 1 is pivoted to a bracket 2, which is clamped to the side bracket or toe-piece $a'$ of the frame of the bicycle, as by means of the clamp-screw 3, and it is held against rotation on the axle $g$, on which it is mounted. The inner end of this lever 1 engages a recess 5 in the brake-actuating member 4, which corresponds to the like member $v$ in the form of the device shown in Figs. 6 to 10 of the drawings. The band 6, with a suitable shoe 7, surrounds the hub near the end and has one end attached to the bracket 2, and thus held against movement, and the other end attached to the outer end of the brake-actuating lever 1. A tilting movement of this lever 1 on its pivot 8 in one direction causes the band 6 to close upon the surface of the hub with a frictional grasp, and thus retard and, if the force is sufficient, stop the rotation of the hub. A tilting movement of the lever in the opposite direction under the impulse of the lever-spring 9 lifts the band out of contact with the surface of the hub. This spring 9 is mounted on the pivot 8 and operates to normally hold the band out of contact with the hub. The brake-actuating mechanism is operated by back-pedaling by the means and in the manner already described.

No claim is herein made to any broad features of combination of parts in the structure, as such are made the subject-matter of another application made by me, Serial No. 724,480, to which reference may be had.

Reference is hereby made to my pending application for patent on driving and brake mechanism for vehicles, filed April 29, 1898, Serial No. 679,185, for broader claims than herein contained on certain features of construction of the driving-hub composed of a plural number of continuous sleeves arranged one within the other, with intermediate clutch devices, and no claim is herein made to such several broader features of construction of said sleeves and connected parts.

I claim as my invention—

1. In a driving and brake mechanism, in combination, a fixed axle, a carrier-sleeve mounted to turn on the axle, a gear-wheel secured to one end of the carrier-sleeve, a carrier mounted at the other end of the sleeve with ratchet-sockets extending therethrough, a clutch member with ratchet recesses on one side of the carrier and fastened to the hub of the driving-wheel, a second clutch member with ratchet-recesses and connected to a brake-operating lever, a brake connected to said brake-lever, and free-moving pawls borne in the sockets in said carrier and adapted to engage the ratchet-recesses in each of the driven clutch members.

2. In a driving and brake mechanism, in combination, a fixed axle, a carrier-sleeve mounted to turn on the axle and extending lengthwise thereof, a gear-wheel secured to one end of the carrier-sleeve, a carrier mounted at the other end of the sleeve with pawl-sockets extending therethrough, a clutch member with ratchet-recesses on one side of the carrier and fast to the driving-wheel hub, a second clutch member with ratchet-recesses and connected to a brake-operating lever, a tire-brake supported on the vehicle-frame, means connecting said tire-brake and the brake-operating lever, and free-moving gravity-operated pawls borne in the sockets in the carrier and adapted to engage the ratchet-recesses in each of the driven clutch members.

3. In a driving and brake mechanism, in combination, a vehicle-frame, a fixed axle, a tilting sectional cone-sleeve borne on the axle, cones located near opposite ends of said sleeve, a carrier-sleeve rotatably mounted on the sectional sleeve, a bevel-gear secured to one end of the carrier-sleeve, a carrier mounted on the other end of the sleeve with pawl-sockets extending therethrough, a clutch member located concentric with the carrier, having clutch-recesses and secured to the driving-wheel hub, a second clutch member with ratchet-recesses and located concentric with the carrier, a brake-operating lever, a brake mechanism, means connecting the brake mechanism and the operating-lever, and free-moving pawls located in the sockets in the carrier and adapted to engage the ratchet-recesses in each of the respective driven clutch members.

4. In a driving and brake mechanism, in combination, a fixed axle, a sectional cone-sleeve borne on the axle and means for adjusting the two sections on each other, cones located near opposite ends of said cone-sleeve, a carrier-sleeve rotatably mounted on the sectional sleeve, a bevel-gear secured to one end of the carrier-sleeve, a carrier mounted at the other end of the sleeve with pawl-sockets extending therethrough, driven clutch members located on opposite sides of the carrier and each having clutch-recesses registering with opposite ends of the sockets through the carrier, one of said driven clutch members secured to the driving-wheel hub, the other of said driven clutch members operatively connected to a brake mechanism, the brake, and free-moving gravity-operated pawls located in the sockets in the carrier and adapted to engage the ratchet-recesses in each of the respective driven clutch members.

JAMES S. COPELAND.

Witnesses:
CHAS. L. BURDETT,
FELTON PARKER.